United States Patent Office 3,439,602
Patented Apr. 22, 1969

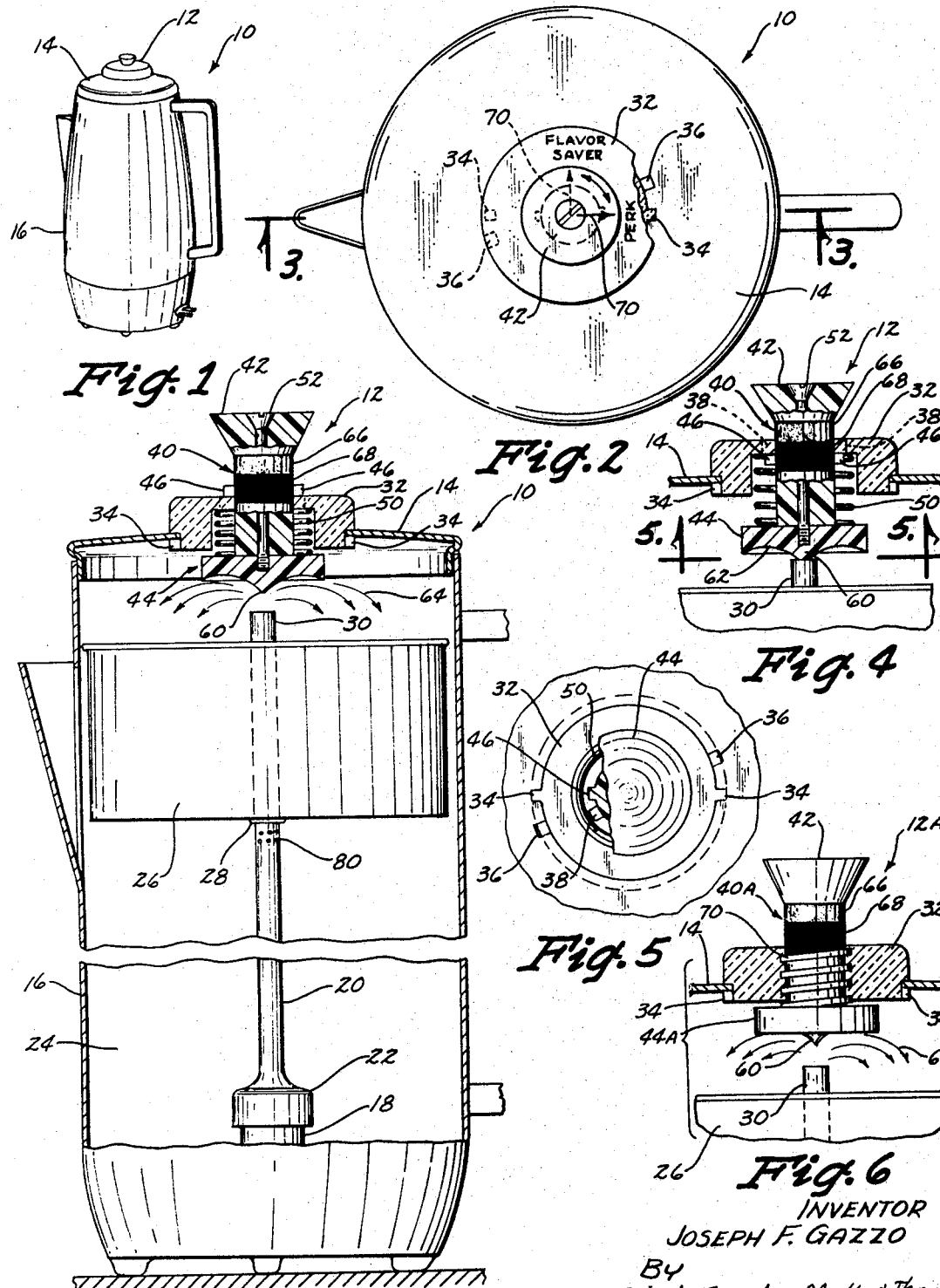

3,439,602
COFFEE PERCOLATION CONTROL
Joseph F. Gazzo, 1303 McKinley Ave.,
Des Moines, Iowa 50315
Filed Dec. 28, 1966, Ser. No. 605,472
Int. Cl. A47f 31/04
U.S. Cl. 99—285       10 Claims

ABSTRACT OF THE DISCLOSURE

A percolator type coffee pot having a valve element for selectively closing the upper open end of the upstanding ejaculator tube in the pot extending through the coffee basket to terminate as desired the further percolation of the coffee should the heated liquid in the bottom of the pot be boiled when keeping the coffee warm. The valve element is spring biased into engagement with the upper end of the tube or may be threadably adjusted. A signalling means is provided to indicate visually whether the valve is open or closed and the valve is carried in the removable element in the lid of the pot which is thermally non-conductive. The valve element for closing the pipe serves as a baffle when the valve element is in its open position to direct fluid impinging thereon in a downward direction into the coffee basket.

A percolator type coffee pot either externally heated or having a temperature heating element which is turned on and off by the operation of the thermostat will boil the liquid around it and thereby repercolate the coffee since the boiled liquid will be forced up through the tube and then back down through the coffee grounds in the coffee basket. This invention provides a simple fool-proof operation device for stopping the further percolation of the coffee after the initial percolation cycle. If the percolation is not stopped, the coffee will obviously become extremely strong since as the percolation is continued further flavoring is added to the coffee solution. By this invention, the upper open end of the tube extending from the heating element through the coffee basket is selectively closed. The valve or closure element may be spring biased into its closed position or may be moved through the use of threads. The spring biased device includes a latch element for selectively locking the valve in an up or open position. A color code signalling system is employed wherein when the valve element is open two colors are exposed above the coffee pot lid and when the valve is in its closed position only one of the colors is exposed. Accordingly, two colors means the valve is open and one color indicates that it is closed. The valve element is mounted in the thermally non-conductive removable member in the lid of the coffee pot which permits the device of this invention to be readily installed in conventional coffee pots having this thermally non-conductive removable member. The valve element's face is conical in shape and is embraced by an annular concave groove which serves to deflect outwardly and downwardly in all directions the liquid from the upper open end of the upstanding pipe such that the liquid is directed back down into the coffee basket.

These and other features and advantages of this invention will become readily apparent to those skilled in the art upon reference to the following description when taken into consideration with the accompanying drawings, wherein:

FIG. 1 is a perspective view of a percolator type coffee pot employing the control device of this invention;

FIG. 2 is an enlarged top plan view of the coffee pot and of the control device mounted in the lid of the coffee pot;

FIG. 3 is a fragmentary cross-sectional view taken along line 3–3 in FIG. 2;

FIG. 4 is a fragmentary cross-sectional view of the control device in operation;

FIG. 5 is a fragmentary view taken along line 5–5 in FIG. 4; and

FIG. 6 is a view similar to FIG. 4 but showing an alternate control device.

A percolator coffee pot is generally referred to by the reference numeral 10 in FIG. 1 and includes a percolating control unit 12 mounted in a lid 14.

The percolator 10 includes a pot or container 16 with an electrical heating element 18 centrally located in the bottom thereof. An upstanding tube or pipe 20 with an enlarged end 22 embracing the heating element 18 is provided in a lower chamber 24 of the container 16. The pipe 20 extends upwardly through a coffee basket 26 which is supported thereon by an annular shoulder 28. The pipe 20 then terminates above the basket 26 in an open end 30 adjacent the lid 14.

The lid 14 includes a removable non-thermal conductive member 32 formed from glass or the like. The member 32 is positioned in the lid 14 by aligning its locking shoulders 34 with the notches 36 in the lid and then turning the member 32 to a position of this alignment relative to the notches. The shoulders 34 bear against the bottom side of the lid 14.

The glass member 32 has a central opening formed therethrough and includes additionally a pair of peripheral notches 38 diametrically opposite each other. A shaft 40 having a handle portion 42 on its outer upper end extends through the opening in the member 32 and is provided with a valve or closure element 44 on its inner end below the lid 14. A pair of diametrically disposed fingers or shoulders 46 extend outwardly from the shaft 40 and are adapted to be moved through the notches 38. An expansion coil spring 50 is positioned on the shaft below the element 32 and against the closure element 44 and thereby tends to move the closure element 44 downwardly. By lifting the shaft 40 upwardly such that the fingers 46 move through the notches 38 and then turning the shaft to a position of disalignment with the notches the control unit will be in an open position with the fingers 46 riding on top of the member 32 as seen in FIG. 3. A bolt 52 extends through the handle portion 42 and along the length of the shaft 40 where it is threadably connected to the closure element 44.

The outer or lower face of the valve or closure element 44 is defined by a centrally located conical portion 60 which is adapted to seat in the open end 30 of the tube 20 as seen in FIG. 4 when the control unit is in its closed position and is yieldably held there by the spring 50. The conical portion 60 merges into an annular concentric concave groove 62 which serves to direct the liquid coming from the open end 30 outwardly and downwardly into the coffee basket 26 when the control unit is in its open position of FIG. 3 as seen by the arrows 64.

A pair of contrasting color stripes 66 and 68 are provided on the shaft 40 such that when the control unit is in its up or open position both of the stripes 66 and 68 are exposed and when the unit is in its closed position of FIG. 4 only the upper lighter in color stripe 66 may be seen. This will visually indicate to the user whether the unit is closed or open. Also, an arrow 70 is provided on the handle portion 42 which may be moved to point to the label "perc" or the label "flavor saver." When the arrow 70 is pointing to the perc label on the member 32 the control unit 12 will be in its open position of FIG. 3 and when the arrow 70 is pointing to the flavor saver label as shown by the arrow indicated by the dash lines, the control unit will be in its closed position of FIG. 4.

It is to be appreciated that the control unit is self-centering and will seek its own level and thus may be used in coffee pots having pipe members 20 of various lengths.

In FIG. 6 an alternate embodiment of the control unit referred to generally by the reference numeral 10A is shown mounted in a glass member on the lid 14. A shaft 40A includes a handle portion 42 and is color coded with contrasting colors 66 and 68. The shaft is also provided with external threads 70 for mating engagement with threads formed in the opening through the member 32A. A closure or valve element 44A is provided on the lower end of the shaft 40A and is similar in construction to the valve element 44. It is thus seen that the valve element 44A may be moved into its closed position by simply turning the shaft 40A until the conical portion 60 is seated in the open end 30 of the pipe 20. The two colors 66 and 68 will be exposed to sight when the control unit is in open position and when it is in a closed position only the color band 66 will be visible.

Thus in operation, it is seen that after the coffee has completed its initial percolation cycle the user can readily move the closure unit 12 or 12A to its closed position closing the open end 30 of the upstanding pipe 20. This will prevent the boiling liquid around the heating element 18 from again moving up through the pipe 20 and back through the coffee in the coffee basket 26 when the heating element is in operation at a later time to keep the coffee warm. If desired, relief openings 80 (FIG. 3) may be provided below the basket 26 in the tube 20 and thereby assure that excessive pressures are not created within the pipe 20 when the closure unit 12 is in its closed position. The user of the coffee pot may readily determine whether the closure unit 12 is in its closed or open condition by visually observing the shaft 40 to determine if one or two color bands are exposed, or notice if the shaft and the handle portion are in their raised or lowered positions, or as a third alternative check the arrow 70 to determine if it is pointing to the "perc" position or the "flavor saver" position.

Some changes may be made in the construction and arrangement of my coffee percolator control without departing from the real spirit and purpose of my invention, and it is my intention to cover by my claims, any modified forms of structure or use of mechanical equivalents which may be reasonably included within their scope.

I claim:
1. A coffee percolator having,
   a container,
   an upstanding pipe extending from the bottom of said container to adjacent the top of said container, the upper end of said pipe being open,
   a coffee basket positioned in and adjacent the top of said container, and said pipe extending through said basket,
   a lid on said container, wherein said improvement comprises,
   a closure element movably mounted on said lid for selectively closing said open upper end of said pipe,
   a spring means normally biases said closure element into closing engagement with said upper open end of said tube, and
   said closure element being movable along the extended longitudinal axis of said tube, and a latch means being provided to hold said closure element in spaced relationship above the upper open end of said tube.

2. The structure of claim 1 wherein said closure element is movable on a shaft extending through said lid, said shaft having a signal means exposed above said lid when said closure element is in its retracted position out of engagement with said upper open end of said tube and said signal means is located on said shaft to be concealed in said lid upon said closure element being moved into closing engagement with the upper open end of said tube.

3. The structure of claim 2 wherein said closure element includes an outer face having a downwardly extending conical portion positioned to be moved into and out of said upper open end of said tube.

4. The structure of claim 3 wherein said conical portion on said closure element face is on the axial center thereof and said conical portion merges into an annular coaxial concave groove.

5. The structure of claim 2 wherein said shaft includes a laterally extending shoulder portion on its outer periphery and said lid has a slot adapted to receive said groove, a shaft handle portion on the outer upper side of said lid whereby said shaft is adapted to be rotated for alignment of said slot with said shoulder and then lifted upwardly until said shoulder is through said slot and adapted to engage the top surface of said lid upon said shaft being turned to disalign said shoulder and said slot.

6. The structure of claim 1 wherein said closure element is further defined as being movably mounted in a heat insulative member removably mounted in the center of said lid.

7. A coffee percolator having,
   a container,
   an upstanding pipe extending from the bottom of said container to adjacent the top of said container, the upper end of said pipe being open,
   a coffee basket positioned in and adjacent the top of said container, and said pipe extending through said basket,
   a lid on said container, wherein said improvement comprises,
   a closure element movably mounted on said lid for selectively closing said open upper end of said pipe,
   said closure element being further defined as being carried on the inner lower end of the threaded shaft extending through a threaded opening in said lid, and
   a handle portion being provided on said shaft outwardly of said lid, said shaft having a signalling means exposed above said lid when said shaft and closure element are retracted and positioned below the top surface of said lid when said shaft and closure element are extended to close said upper open end of said tube.

8. A coffee percolator having,
   a container,
   an upstanding pipe extending from the bottom of said container to adjacent the top of said container, the upper end of said pipe being open,
   a coffee basket positioned in and adjacent the top of said container, and said pipe extending through said basket,
   a lid on said container, wherein said improvement comprises,
   a closure element movably mounted on said lid for selectively closing said open upper end of said pipe,
   said pipe having at least one relief opening located below said basket whereby heated liquid is circulated up said pipe and out said relief opening independently of said basket when said open upper end of said pipe is closed, and
   said closure element is movable along the extended longitudinal axis of said pipe, and a releasable latch means is provided to hold said closure element in spaced relationship above the upper open end of said pipe.

9. The structure of claim 8 wherein said closure element includes an outer face having a downwardly extending conical portion positioned on the extended axial center of said pipe and adapted to be moved into and out of said upper open end of said pipe and said conical portion merges into an annular coaxial concave groove whereby liquid moving upwardly and outwardly of said upper open end of said pipe is deflected uniformly downwardly into said basket.

10. The structure of claim 8 wherein a heating element is positioned in the bottom of said container and said pipe includes an open portion on its lower end extending over said heating element whereby heated liquid around said heating element is directed up said pipe.

References Cited

UNITED STATES PATENTS

| | | | |
|---|---|---|---|
| 3,040,648 | 6/1962 | Vieceli | 99—305 X |
| 3,068,777 | 12/1962 | Pedalino | 99—305 |
| 3,129,318 | 4/1964 | Morrison | 99—310 X |

FOREIGN PATENTS

| | | |
|---|---|---|
| 740,618 | 8/1966 | Canada. |
| 1,061,936 | 12/1953 | France. |
| 1,216,368 | 11/1959 | France. |
| 395,562 | 7/1933 | Great Britain. |

WILLIAM J. PRICE, *Primary Examiner.*

U.S. Cl. X.R.

99—305, 312